March 29, 1955  D. D. KLOSS  2,705,065
HELICAL SPRING FRICTION CLUTCH
Filed Jan. 26, 1952
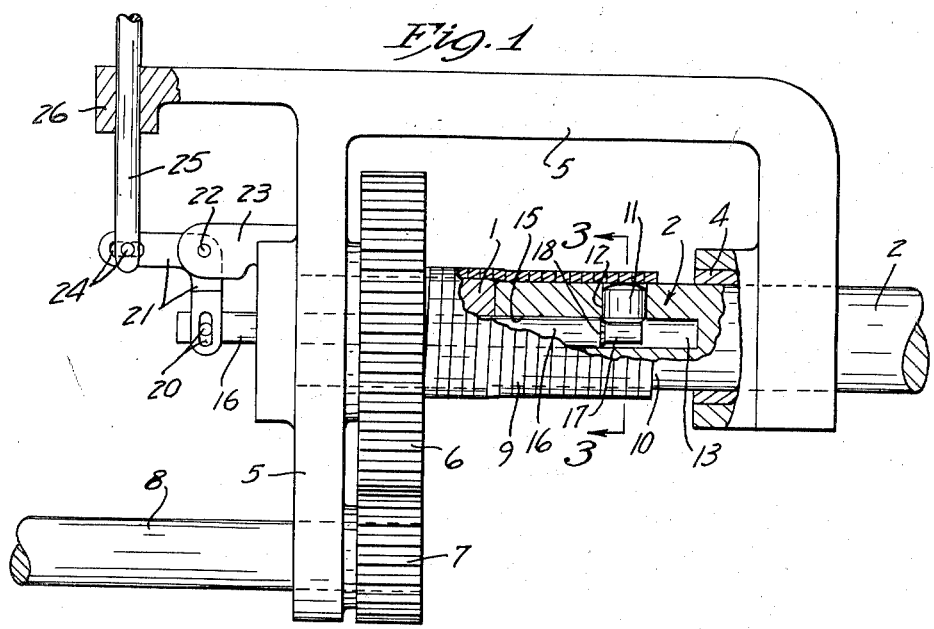
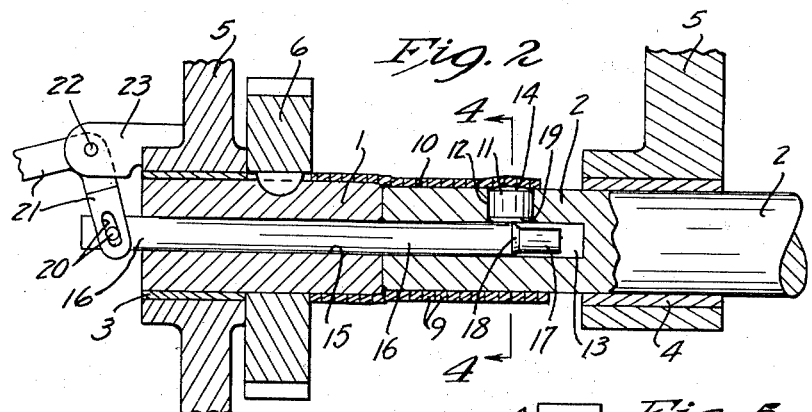
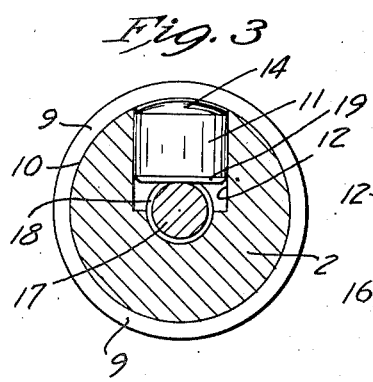
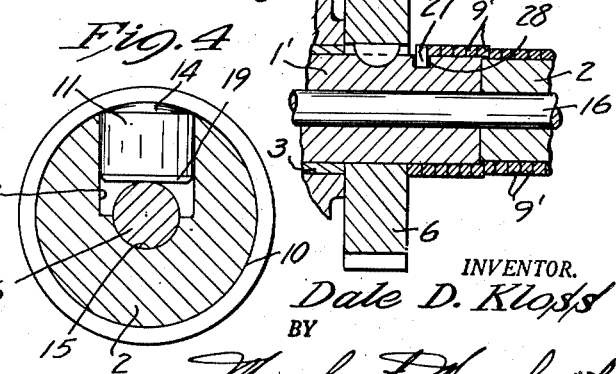
INVENTOR.
Dale D. Kloss
BY
Merchant & Merchant
ATTORNEYS United States Patent Office 2,705,065
Patented Mar. 29, 1955

2,705,065

HELICAL SPRING FRICTION CLUTCH

Dale D. Kloss, Minneapolis, Minn., assignor to Champion Motors Company, Minneapolis, Minn., a corporation of Minnesota Application January 26, 1952, Serial No. 268,430

8 Claims. (Cl. 192—41)

My invention relates generally to clutch mechanisms and more particularly to clutches of the type involving helically wound clutch-acting springs which engage cylindrical surfaces of driving and driven members to couple the same together in driving engagement.

An important object of my invention is the provision of an externally applied normally released coil spring clutch having simple and efficient control means for setting and releasing the same.

In accordance with the present invention, I provide axially aligned driving and driven shafts having exterior cylindrical surfaces encompassed by a helically wound clutch spring, said spring being anchored to one of the shafts and normally permitting free rotation of the other thereof. An actuator, extending axially within one of the shafts, cooperates with a member which engages a portion of one or more convolutions of the spring and moves said portion or portions in a direction radially outwardly of the exterior cylindrical surface, thus causing the remaining portions of the engaged convolution or convolutions to contract radially against and grip the underlying surface of the otherwise free-running shaft.

Another object of my invention is the provision of a clutch mechanism, as set forth, which can be produced at low cost and which is rugged in construction and durable in use.

The above and still further highly important objects and advantages of my invention will become apparent from the following detailed specification, appended claims, and attached drawings.

Referring to the drawings which illustrate the invention and in which like characters indicate like parts throughout the several views:

Fig. 1 is a view in side elevation of a transmission mechanism incorporating my invention, some parts being broken away and some parts being shown in section;

Fig. 2 is a fragmentary view corresponding to a portion of Fig. 1 but showing a different position of some of the parts, some thereof being shown in section;

Fig. 3 is a transverse section taken on the line 3—3 of Fig. 1;

Fig. 4 is a transverse section taken on the line 4—4 of Fig. 2; and

Fig. 5 is a view similar to a portion of Fig. 2 but showing a modified arrangement of parts.

In the preferred embodiment of the invention illustrated in Figs. 1 to 4 inclusive, driving and driven shafts 1 and 2 respectively are shown as being in axially aligned relationship with their adjacent ends in substantially abutting engagement. The shafts 1 and 2 are journalled in suitable bearings 3 and 4 respectively mounted in a frame structure 5 which, in the drawings, is shown more or less diagrammatically. The driving shaft 1 is shown as having keyed thereon a gear 6 which has meshing engagement with a drive pinion 7 fast on the end of a power shaft 8. The shaft 8 may be assumed to be connected to a suitable source of power such as a motor or engine, not shown, and is driven in one direction of rotary movement. The driven shaft 2 may also be assumed to be coupled to a device to be driven such as a wheel, propeller, or the like, not shown. Neither the source of power nor the device to be driven by the driven shaft 2 comprise the instant invention and, for the sake of brevity, showing and description of these elements are omitted.

A helically wound clutch-acting spring 9 encompasses the driving shaft 1 axially outwardly of the gear 6 and an axially extended portion of the driven shaft 2. The spring 9 is of a size relative to the driving shaft 1 so as to be frictionally anchored thereon. However, the convolutions of the spring 9 encompass the underlying surface portion 10 of the driven shaft 2 sufficiently loosely to normally permit free rotation of the driven shaft 2 with respect thereto. As illustrated in Figs. 1 and 2, the driving shaft 1 is of greater diameter than the spring encompassed portion of the driven shaft 2 so that the convolutions of the spring 9 which encompass the driving shaft 1 are diametrically expanded with respect to those which encompass the driven shaft 2. By this means, frictional anchoring of the spring 9 on the driving shaft 1 is attained.

For the purpose of radially contracting sufficient of the convolutions of the spring 9 overlying the outer cylinder surface 10 of the driven shaft 2 to cause driving engagement therebetween, I provide a movable member in the nature of a pin or the like 11 which is radially movable in a passage 12 which extends radially inwardly from the outer surface 10 of the shaft 2 and communicates at its inner end with an axially extended passage 13 in the driven shaft 2. The radially outer end of the pin 11 is preferably rounded, as indicated at 14, and engages a portion of one or more convolutions of the spring 9 upon radially outward movement and moves said portion or portions radially outwardly from the underlying surface portion of the shaft 10. This movement causes the remaining portions of the said convolution or convolutions and adjacent convolutions to contract radially against and grip the underlying outer cylindrical surface 10 of the driven shaft 2 whereby to impart rotary movement thereto in the same direction as that of the driving shaft 1. The direction of rotation of the driving shaft 1 is such as when the convolutions of the spring 9 are contracted radially, as above described, said convolutions will tend to wrap themselves tightly around the driven shaft 2 and exert sufficient friction thereagainst to effect substantially a positive drive.

The driving shaft 1 is provided with an axial passage 15 which is axially aligned with the passage 13 in the driven shaft 2 and of substantially the same diameter. An actuator rod 16 extends through the passage 15 and into the aligned passage 13 and is axially slidable therein. At its inner end, the actuator rod 16 is diametrically reduced, as indicated at 17, to provide a cam-acting surface 18 that is engageable with the inner end 19 of the pin 11 to move the same radially outwardly upon axial movements of the rod 16 in one direction. Movement of the actuator rod in a direction from the right to the left with respect to Figs. 1 and 2 will cause the reduced end 17 to underlie the pin 11 so that the pin will be permitted to move radially inwardly out of operative engagement with the overlying convolutions of the spring 9, see Figs. 1 and 3. When the actuator rod is moved in a direction from the left to the right with respect to Figs. 1 and 2, the cam-acting surface 18 will engage the inner end 19 of the pin 11, as above indicated to move the same outwardly into clutch-setting engagement with the overlying convolutions of the spring 9 at which point the inner end of the pin 11 may come to rest on the maximum diameter portion of the actuator rod 16, as indicated in Figs. 2 and 4. At its outer end, the rod 16 has a pin and slot connection 20 with one end portion of a bell crank 21 that is pivotally mounted at its intermediate portion, as indicated at 22, to a supporting bracket 23 formed as part of the frame structure 5. The opposite end of the bell crank 21 has a pin and slot connection 24 with one end of a control rod 25 which extends through and is slidable in a bearing element 26 integrally formed with the frame structure 5. Obviously axial movement of the control rod 25 in opposite directions will cause corresponding axial movement to be imparted by the bell crank 21 to the actuator rod 16 to set and release the clutch. In other words, movement of the control rod 25 in a downward direction will cause corresponding inward movement of the actuator rod 16 to set the clutch, whereas upward movement of the control rod 25 will cause partial withdrawal of the actuator rod 16 to release the clutch.

In the modified arrangement illustrated in Fig. 5, the clutch spring 9' is provided at one end with a radially inwardly projecting ear 27 which is received within a recess or pocket 28 in the driving shaft 1'. This arrangement provides a positive anchoring of the clutch spring 9' to the driving shaft 1' as compared to the frictional anchoring of the clutch spring to the shaft of Figs. 1 to 4 inclusive. Otherwise the structure of Fig. 5 is identical to that of Figs. 1 to 4 inclusive and parts shown common to both structures bear like reference characters.

My invention has been thoroughly tested and found to be completely satisfactory for the accomplishment of the objectives set forth; and, while I have shown and described a preferred embodiment and one modification of my novel helical spring friction clutch and control therefor, it will be understood that the same is capable of further modification within the spirit and scope of the invention, as defined in the claims.

What I claim is:

1. In a helical spring friction clutch, cooperating driving and driven rotary shaft elements having cylindrical external wall surfaces, means journalling said shaft elements in axial alignment, a helical clutch-acting spring encompassing the external wall surfaces of the shaft elements and anchored to one thereof for common rotation therewith, and means for moving a portion of a convolution of said spring radially outwardly from the surface of the other of said shaft elements whereby to cause the remaining portions of said convolution and adjacent convolutions to contract radially against and grip the underlying external surface of said other shaft element.

2. The structure defined in claim 1 in which the shaft to which said spring is anchored is of greater diameter than the other of said shafts.

3. In a helical spring friction clutch, cooperating driving and driven rotary shafts having cylindrical external wall surfaces, means journalling said shafts in axial alignment, a helical clutch-acting spring encompassing the external wall surfaces of the shafts and anchored to said drive shaft for common rotation therewith, and means for moving a portion of a convolution of said spring radially outwardly from the surface of said drive shaft whereby to cause the remaining portions of said convolution and adjacent convolutions to contract radially against and grip the underlying external surface of said driven shaft, said drive shaft having an axial passage therein, said last-mentioned means including an actuator extending axially within the passage in said driven shaft.

4. In a helical spring friction clutch, cooperating driving and driven rotary shaft elements having cylindrical external wall surfaces, means journalling said shaft elements in axial alignment, a helical clutch-acting spring encompassing the external wall surfaces of the shaft elements and anchored to one thereof for common rotation therewith, the other of said shafts having an axially extended passage and a radially extended passage communicating with the axially extended passage, a movable member in said radial passage, and an actuator axially movable in said axially extended passage in one direction to engage and move said movable member in a radially outward direction against a portion of one of the convolutions of the spring whereby to move said portion radially outwardly and cause the remaining portions of said convolution and adjacent convolutions to contract radially against and grip the underlying external surface of said other shaft element.

5. The structure defined in claim 4 in which said spring is anchored against movements longitudinally of said shaft elements and in which the shaft element to which said spring is anchored is of greater diameter than the other of said shaft elements.

6. In a helical spring friction clutch, cooperating driving and driven rotary shaft elements having cylindrical external wall surfaces, means journalling said shaft elements in axial alignment, a helical clutch-acting spring encompassing the external wall surfaces of the shaft elements and anchored to one thereof for common rotation therewith, and means for moving a portion of a convolution of said spring radially outwardly from the surface of the other of said shaft elements whereby to cause the remaining portions of said convolution and adjacent convolutions to contract radially against and grip the underlying external surface of said other shaft element, said other shaft element having an axially extended passage therein and a radially outwardly opening passage communicating with the axially extended passage, said last-mentioned means comprising a cam-acting member in said axially extended passage and a cooperating cam follower in said radial passage engageable by said cam-acting member.

7. In a helical spring friction clutch, cooperating driving and driven rotary shafts having cylindrical external wall surfaces, means journalling said shafts in abutting axial alignment, a helical clutch-acting spring encompassing the external wall surfaces of the shafts and anchored to said driving shaft for common rotation therewith, said driving shaft having an axial passage therethrough, said driven shaft having a passage extending axially inwardly from the end thereof adjacent the driving shaft and aligned with the passage therein, said drive shaft having a radially extended passage communicating with the axial passage therein, an actuator extending through the axial passages in said shafts and longitudinally movable with respect to the shafts, said actuator having a cam-acting surface portion thereon registrable with the radial passage in the driven shaft upon longitudinal movements of the actuator in one direction, and a cam follower member in said radial passage and having its inner end in sliding engagement with said actuator and its outer end engageable with a portion of one of the convolutions of said spring responsive to longitudinal movement of the actuator in a direction to cause camming engagement of said cam-acting surface portion with the inner end of said cam follower member, whereby to move a portion of one of the convolutions of the spring radially outwardly and cause the remaining portions of said convolution and adjacent convolutions to contract radially against and grip the underlying external surface of said other shaft element.

8. The structure defined in claim 7 in which said driving shaft is of greater diameter than said driven shaft and in which said spring is frictionally anchored to said driving shaft.

References Cited in the file of this patent

UNITED STATES PATENTS

| | | |
|---|---|---|
| 1,954,614 | Brownlee | Apr. 10, 1934 |
| 2,140,975 | Welch | Dec. 20, 1938 |

FOREIGN PATENTS

| | | |
|---|---|---|
| 421,546 | Germany | Nov. 13, 1925 |
| 421,547 | Germany | Nov. 13, 1925 |